US012769883B2

(12) United States Patent
Ghatage et al.

(10) Patent No.: US 12,769,883 B2
(45) Date of Patent: Oct. 20, 2026

(54) METHOD AND SYSTEM UTILIZES A CONFIGURABLE AND SCALABLE ARCHITECTURE FOR DATA SECURITY AND PRIVACY MANAGEMENT DURING DATA INGESTION

(71) Applicant: Accenture Global Solutions Limited, Dublin (IE)

(72) Inventors: Prakash Ghatage, Bangalore (IN); Nirav Jagdish Sampat, Mumbai (IN); Sreevidya Prasad, Bangalore (IN); Naveen Kumar Thangaraj, Bangalore (IN); Sattish Sundarakrishnan, Bangalore (IN); Vamsi Peddireddy, Nellore (IN); Richard Stephen Vincent Price, Palatine, IL (US); Ranjani Arudi Satish, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 44 days.

(21) Appl. No.: 19/015,001

(22) Filed: Jan. 9, 2025

(65) Prior Publication Data

US 2026/0195484 A1 Jul. 9, 2026

(51) Int. Cl.
*G06F 21/62* (2013.01)
*G06F 21/55* (2013.01)

(52) U.S. Cl.
CPC ........ *G06F 21/6254* (2013.01); *G06F 21/552* (2013.01); *G06F 2221/034* (2013.01)

(58) Field of Classification Search
CPC ............... G06F 21/6254; G06F 21/552; G06F 2221/034
USPC ............................................................ 726/22
See application file for complete search history.

(56) References Cited

U.S. PATENT DOCUMENTS

| | | | | |
|---|---|---|---|---|
| 9,847,973 | B1 * | 12/2017 | Jakobsson | H04L 63/0245 |
| 11,765,112 | B2 * | 9/2023 | Kochhar | G06F 40/205 709/206 |
| 2020/0110895 | A1 * | 4/2020 | Chakra | G06F 21/6245 |
| 2024/0020029 | A1 * | 1/2024 | Bert | G06F 3/0629 |
| 2024/0137371 | A1 * | 4/2024 | Almulhim | H04L 63/1425 |

* cited by examiner

*Primary Examiner* — Bryan F Wright
(74) *Attorney, Agent, or Firm* — Seed Intellectual Property Law Group LLP

(57) ABSTRACT

A method, system, and computer-readable storage media for data ingestion are disclosed. Input messages directed to a user are received. Further, it is determined whether one or more of the input messages are spam messages. Upon determining the one or more of the input messages as the spam messages, the spam messages are filtered from the input messages. Further, it is determined whether remaining input messages pose a security risk based upon a risk score of each of the remaining input messages that meets a specific threshold condition. When the remaining input messages pose a low security risk, personal identifiable information is identified in the remaining input messages. Data corresponding to the personal identifiable information is masked to remove and/or hide the personal identifiable information from display of the remaining input messages. Upon masking the data, the remaining input messages are transmitted to a storage device.

18 Claims, 5 Drawing Sheets

METHOD AND SYSTEM UTILIZES A CONFIGURABLE AND SCALABLE ARCHITECTURE FOR DATA SECURITY AND PRIVACY MANAGEMENT DURING DATA INGESTION

TECHNICAL FIELD

Various examples described herein relate generally to a method, system, and computer program product for performing data ingestion.

BACKGROUND

With the proliferation of connected devices, the internet of things (IoT), social media, and cloud-based applications, an amount of data generated by organizations has grown exponentially. The organizations are increasingly reliant on large volumes of data for making informed decisions, improving operational efficiency, and enabling advanced analytics by leveraging machine learning and artificial intelligence. As a result, data ingestion which is a process of collecting, importing, and consolidating data from multiple sources into a central data storage system has become a critical component of modern data infrastructure.

SUMMARY

Implementations of the present disclosure provide a digital data ingestion platform that utilizes a configurable and scalable architecture for data security and privacy management during data ingestion.

In at least one example, the present disclosure provides a computer implemented method for performing data ingestion. The method may include receiving input messages directed to a user. The method may further include determining whether one or more of the input messages are spam messages based upon one or more of: prior user actions, rule-based filtering criteria, a domain categorization, and/or a user validation. Upon determining the one or more of the input messages as the spam messages, the method may include filtering the one or more of the input messages from the input messages. Upon filtering the one or more of the input messages from the input messages, the method may include determining whether remaining input messages pose a security risk based upon a risk score of each of the remaining input messages that meets a specific threshold condition. The method may further include identifying personal identifiable information in the remaining input messages when the remaining input messages pose a low security risk. The method may include masking data corresponding to the personal identifiable information to remove and/or hide the personal identifiable information from display of the remaining input messages. Upon masking the data corresponding to the personal identifiable information, the method may include transmitting the remaining input messages to a storage device.

The present disclosure further describes a system for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that method in accordance with the present disclosure can include any combination of the aspects and features described herein. That is, the method in accordance with the present disclosure is not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Various examples in accordance with the present disclosure will be described with reference to the drawings, in which.

Like reference numbers and designations in the various drawings indicate like elements.

DETAILED DESCRIPTION

Figure 1:
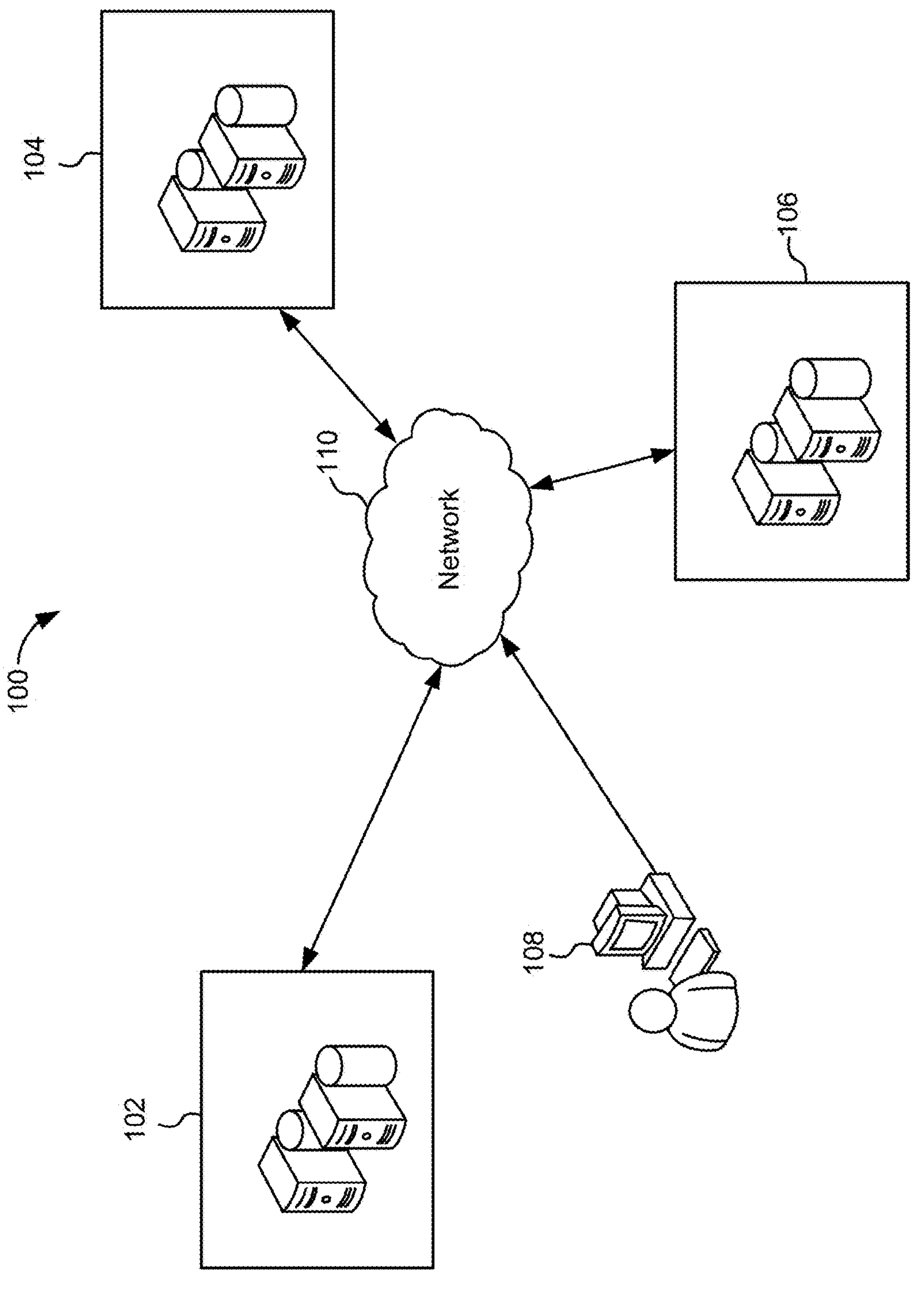
FIG. 1 depicts an example environment that may be used to execute implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Reference to any "example" herein (e.g., "for example," "an example of," by way of example," or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term “comprising” when utilized means “including, but not necessarily limited to”; it specifically indicates open-ended inclusion or membership in the so-described combination, group, series, and the like.

The term “a” means “one or more” unless the context clearly indicates a single element.

“First,” “second,” etc., re labels to distinguish components or blocks of otherwise similar names but does not imply any sequence or numerical limitation.

“And/or” for two possibilities means either or both stated possibilities (“A and/or B” covers A alone, B alone, or both A and B take together), and when present with three or more stated possibilities means any individual possibility alone, all possibilities taken together, or some combination of possibilities that is less than all of the possibilities. The language in the format “at least one of A . . . and N” where A through N are possibilities means “and/or” for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring example examples.

The specification and drawings are to be regarded in an illustrative rather than a restrictive sense. It will, however, be evident that various modifications and changes may be made thereunto without departing from the broader spirit and scope as set forth in the claims.

This disclosure should be interpreted according to the exemplary definitions provided below. In case of a contradiction between the definitions in the definitions section and other sections of this disclosure, this section should prevail. In case of a contradiction between the definitions in this section and a definition or a description in any other document, including in another document incorporated in this disclosure by reference, this section should prevail, even if the definition or the description in the other document is commonly accepted by a person of ordinary skill in the art.

“Input messages” and the like may refer to digital data or digital messages received from different types of sources in real-time. The input messages can be received in any format, such as an email, a text message, a chat message, an instant message, a social media message, a conversation transcript, and/or a file.

“Spam messages” and the like may refer to input messages that are vulnerable to cause a security threat or a cyber-attack in an organization.

Data ingestion from myriad sources is an important step in a digitization journey for any enterprise or organization. Existing data ingestion systems employ a range of technologies such as batch processing frameworks (e.g., Apache Hadoop, Apache Spark), real-time streaming platforms (e.g., Apache Kafka, Amazon Kinesis), and ETL (Extract, Transform, Load) tools for performing the data ingestion. The data ingestion performed by the existing data ingestion systems may include data discovery and acquisition, data validation, data transformation, and data loading. The data discovery and acquisition may involve identifying available data and associated data sources and collecting the identified data from the respective data sources. However, the existing data ingestion systems may suffer from limitations when the data is required to be collected from different data sources (e.g., heterogenous data sources) and/or new data sources, as the existing data ingestion systems may be capable of collecting the data only from pre-defined data sources and may not be scalable to accommodate more application integrations and support throughput for new applications. Also, the existing data ingestion systems may not offer flexibility needed to adapt to rapidly changing requirements in the organization. The data validation may involve validating the collected data for consistency and accuracy. However, the data validation may pose significant risk to data privacy, when handling the data collected from the different data sources. The data transformation may involve document conversion, which may include converting the data from a raw format into a format that is more suitable to use. The document conversion may be performed by handling multiple requirements and error conditions. However, such a document conversion is performed with increased cost. Further, some of the existing data ingestion systems may have basic email integration capability, but they do not handle the error conditions and audit logging required for an industrialized service. In addition, the existing data ingestion systems may be built with ageing technology that does not support cloud portability. For example, the existing data ingestion systems may not support cloud providers and use platform-agnostic components. Therefore, there may exist different challenges during different processes of the data ingestion (e.g., during the data acquisition, the data validation, and the data transformation). Due to these challenges, the existing data ingestion systems may expend a significant amount of time, human resources, and computing resources (e.g., processing resources, memory resources, communication resources, and/or the like) to perform the data ingestion. Therefore, the data ingestion becomes a complex and costly process for the organization.

Implementations of the present disclosure enable data security and privacy during data ingestion by supporting multiple data formats. The input messages are analyzed to determine whether the input messages include spam messages based upon one or more of: prior user actions, rule-based filtering criteria, a domain categorization, and/or a user validation. Thereby, identifying spam and/or social engineering threats using customized classification models with low latency. Upon filtering the spam messages, it is determined whether the remaining input messages pose a security risk. When the remaining input messages pose a low security risk, personal identifiable information included in the remaining input messages is masked and the remaining input messages are transmitted to a storage device. In an example, masking the personal identifiable information may be performed in the remaining input messages from source documents to prevent sensitive data being ingested into multiple systems.

FIG. 1 depicts an example environment 100 that may be used to execute implementations of the present disclosure. The example environment 100, shown in FIG. 1, includes an application server 102, a data ingestion device 104 (also be referenced to as Document Integrator (DI) device), a storage device 106 and a user device 108. For simplicity, a single user device 108 is depicted in FIG. 1, however it should be noted that the example environment 100 may include one or more user devices. The application server 102, the data ingestion device 104, the storage device 106 and the user device 108 may communicate with each other using a network 110. In some examples, the network 110 may include a Local Area Network (LAN), a Wide Area Network (WAN), the Internet, or a combination thereof. In some examples, the network 110 may be accessed over a wired and/or a wireless communication link.

The application server 102 may include communication devices and/or computing devices. For example, the application server 102 may include a server such as a web server, a database server, a host server, a proxy server, a virtual server (e.g., executing on a computing hardware), or a server in a cloud computing system.

The data ingestion device 104 is a computing device that receives input messages directed to a user of the user device 108 from the application server 102. The data ingestion device 104 may then process and store the input messages in the storage device 106. In some examples, the data ingestion device 104 may include internal or external servers, quantum computers, desktops, laptops, smartphones, tablets, and/or the like. It is contemplated that implementations of the present disclosure may be realized with any appropriate type of computing device or computing platform. In some examples, the data ingestion device 104 may display one or more Graphical User Interfaces (GUIs) that enable the user of the user device 108 to interact with a computing platform executing data ingestion applications. Examples of the computing platform may include content delivery platforms, multimedia-based platforms, and/or the like. Interacting with the computing platform may include providing feedback during the process of data ingestion. For example, the data ingestion device 104 is described in more detail with reference to FIG. 2.

Further, the storage device 106 may include any standalone server or any type of computing device that are part of a cloud computing environment for storing data that is ingested by processing the input messages. Various examples depicting the data ingestion is described in detail in conjunction with FIGS. 2-5.

Figure 2:
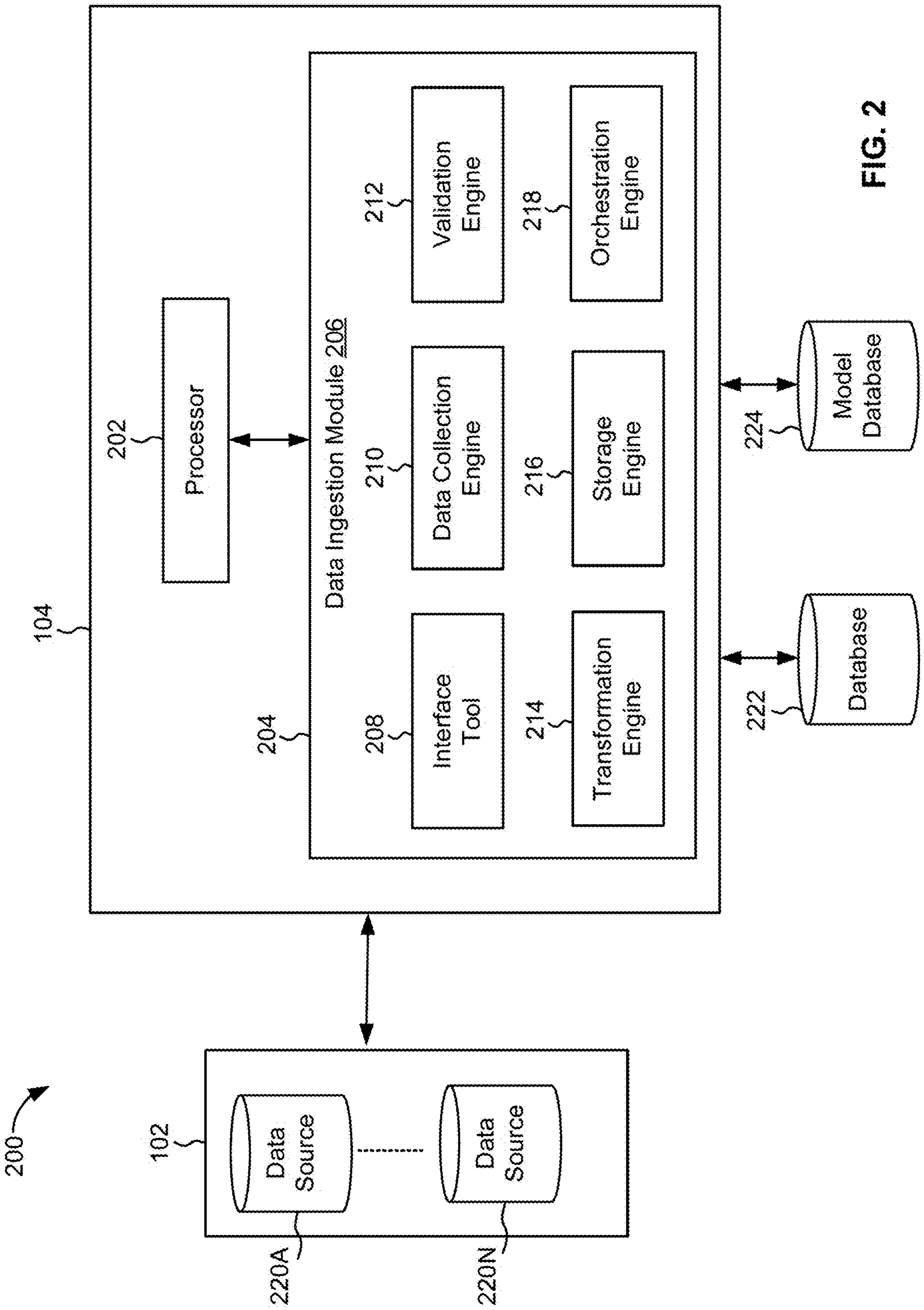
FIG. 2 depicts an example architecture of a data ingestion device for performing data ingestion, in accordance with implementations of the present disclosure.

FIG. 2 depicts an example architecture 200 of the data ingestion device 104, in accordance with implementations of the present disclosure. As depicted in FIG. 2, the data ingestion device 104 is communicatively coupled to a plurality of data sources 220A-N of the application server 102. The plurality of data sources 220A-N stores the input messages directed to the user of the user device 108. Also, the data ingestion device 104 is communicatively coupled to a database 222 (e.g., the storage device 106) and a model database 224. For example, the database 222 can be a client database or a metadata database. In some examples, the model database 224 may include one or more Large Language Models (LLMs) (also referenced herein as Generative Artificial Intelligence (GAI)) models, foundation models, and/or the like). In an implementation, the LLMs may include pre-trained LLMs or generated LLMs. The pre-trained LLMs may be general-purpose GAI models like large deep learning neural networks, which may be trained using a broad range of generalized and unlabeled training data to perform one or more tasks, such as, human computer interactions (e.g., question and answering), automating process execution, process planning, generating step-by-step procedures for the process execution, performing data analysis, and/or the like. While implementations of the present disclosure are described in further detail herein with non-limiting reference to the LLMs, it is contemplated that implementations of the present disclosure may be realized using any appropriate foundation models or Machine Learning (ML) models, or Artificial Intelligence (AI) models.

As depicted in FIG. 2, the data ingestion device 104 includes a processor 202 and a memory 204. The data ingestion device 104 may also include other components such as communication interfaces, Input/Output (I/O) devices, and so on (not shown in FIG. 2). The processor 202 may include one or more processors. Examples of the one or more processors may include, but not limited to, microprocessors, microcomputers, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the processor 202 may be programmed to execute computer-readable instructions stored in the memory 204 (also referenced herein as computer-readable storage medium (CRM)) for performing operations according to the present disclosure. The memory 204 may be non-transitory or non-volatile medium, such as a magnetic disk or solid-state non-volatile memory or volatile medium such as Random Access Memory (RAM), and/or the like.

The data ingestion device 104 further includes a data ingestion module 206, as depicted in FIG. 2. The data ingestion module 206 may be stored in the memory 204 and provided as a downloadable library including the computer-readable instructions. The data ingestion module 206 may be executed by the processor 202 communicatively coupled with the memory 204 for performing data ingestion of the input messages. As depicted in FIG. 2, the data ingestion module may include an interface tool 208, a data collection engine 210, a validation engine 212, a transformation engine 214, a storage engine 216, and an orchestration engine 218.

Figure 3:
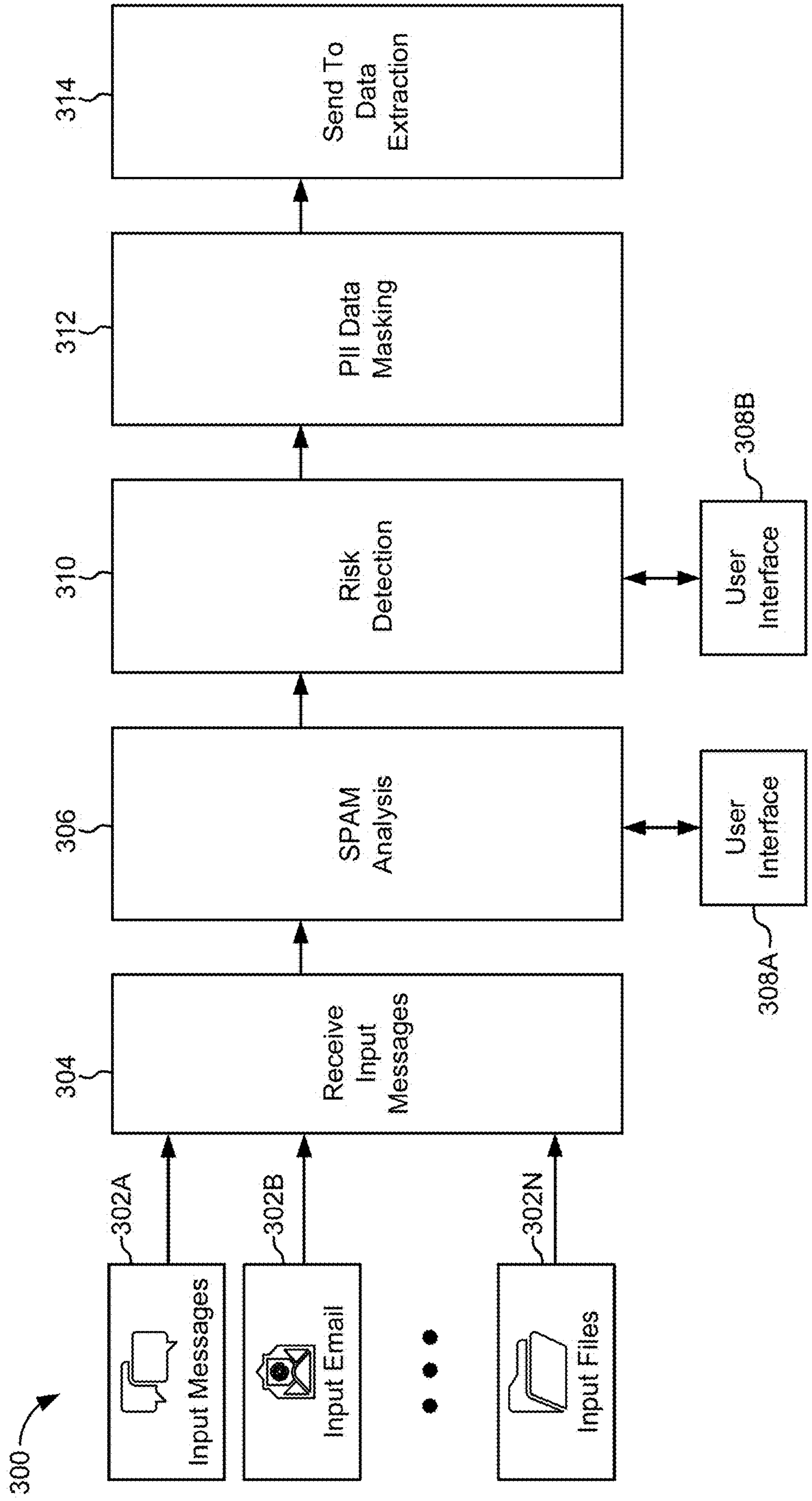
FIG. 3 depicts an example process flow of the data ingestion, in accordance with implementations of the present disclosure.

An example process flow 300 of enabling the data security and privacy by the validation engine 212 is described in detail along with FIG. 3. In some implementations, the data ingestion module 206 may leverage multiple customized logics for performing its intended functions. In some examples, multiple customized logics may include Generative Artificial Intelligence (Gen AI) models, Deep Learning (DL) models, deep neural networks, and/or the like.

The data collection engine 210 may receive the input messages 302A-N from the plurality of data sources 220A-N via the interface tool 208. The input messages 302A-N may be received as an email, a text message, a chat message, an instant message, a social media message, a conversation transcript, and/or a file. In some examples, the input messages 302A-N may be collected over time and stored in a memory of the application server 102 or in any external database(s). The data collection engine 210 may store the received input messages 302A-N in the database 222 (depicted in FIG. 2). For example, the input messages 302A-N may be received from the application server 102 or the database 222. In an implementation, the received input messages 302A-N may be unencrypted or pre-decrypted. In some examples, the transformation engine 214 may transform the input messages 302A-N by performing one or more of converting, splitting, merging, and annotating the input messages 302A-N in a predefined format.

After receiving the input messages 302A-N, the validation engine 212 may perform spam analysis 304 to determine whether one or more of the input messages are spam messages based upon one or more of: prior user actions, rule-based filtering criteria, a domain categorization, and/or a user validation. In some examples, the validation engine 212 may transform or convert the received input messages 302A-N into a particular format or data streams. In an implementation, the validation engine 212 may filter out spam or unwanted messages from the transformed or converted input messages. Generally, the received input messages 302A-N are sent through spam filters which may use a Naïve Bayes algorithm to remove more common or general categories of spam or malicious messages.

Further, the validation engine 212 may augment the spam filters to allow a stricter or narrower set of message categories to be sent through for further processing and to filter out remaining spam messages. In an implementation, the data ingestion device 104 maintains a list of blocked users and domains based on the prior user actions and continuous high threat scores in the database 222 via the storage engine 216. The validation engine 212 filters one or more of the inputs messages 302A-N as the spam messages 304 based on the blocked users and domains. In another implementation, the validation engine 212 removes one or more of the received input messages 302A-N based on the rule-based filtering criteria, such as auto responses, meeting invites, message delivery failures, response message, and presence of specific file formats within attachments and the like.

In yet another implementation, the validation engine 212 categorizes the received input messages 302A-N into domains, such as a finance domain, a human resource (HR) domain, an information technology domain, a medical or health domain and the like. The validation engine 212 may process the input messages 302A-N that are categorized under a certain domain or combination of domains. For example, the validation engine 212 performs domain categorization using a logistic regression model. In this example, the validation engine 212 collects data for building the logistic regression model from source messages which are received from specific helpdesks associated with users. The validation engine 212 may label the collected data with the domain based on a source of the data. The validation engine 212 may then split the data into training data and test data. The validation engine 212 may then train the logistic regression model using the training data based on independent variables after identifying suitable independent and dependent variables. In some examples, the independent variables may be words or combination of words) used in a subject and body of an email. Also, presence of an attachment and file name of the attachment in the email may be known as features. In some examples, the dependent variables may be a separate representative value for each category. For example, 0 for a human resource (HR) category and 1 for a finance category. This allows us to classify a particular email to belong to more than one category. To train the logistic regression model, the validation engine 212 may generate a mathematical representation, also known as a numerical vector, of textual feature data by using Term Frequency-Inverse Document Frequency (TF-IDF) technique.

Further, the validation engine 212 may adjust a threshold value for low precision and high recall. For example, based on a data set used for training, a threshold value of 0.4 may provide best results. This means, if the model predicts that a probability of the email belonging to a category is 40%, then the email may be classified as belonging to that category.

After training the logistic regression model, the validation engine 212 may test the logistic regression model using the test data and evaluate output of the logistic regression model. The validation engine 212 may then adjust the independent variables, threshold value to tune the logic regression model accordingly. In some examples, training the logistic regression model may involve adjusting weights of the features based on the training and test data sets. For example, a lot of emails may be received by finance helpdesks requesting for processing of invoices. These emails may not contain meaningful text in body but may have relevant subjects. By increasing weights of subject and attachment names and reducing weights of the body, the emails may be more accurately categorized. The logistic regression model may be tuned to identify the weights that are suitable for overall dataset. The validation engine 212 may then determine the spam messages 304 in the received input messages 302A-N using the trained and tested logistic regression model.

Further, once the one or more input messages are determined as the spam messages 304 based on the prior user actions, the rule-based filtering criteria and/or the domain categorization, the validation engine 212 may block the spam messages 304 from further processing such as, risk detection 310, and display the spam messages on a user interface 306 of the user device 108 for user's review or validation of the spam messages based upon performed spam analysis 304 in real-time. The validation engine 212 may receive feedback from the user that the one or more input messages are not spam messages. Then, the validation engine 212 may send the input messages that are not the spam messages for risk detection 310. The one or more input messages confirmed by the user as the spam messages, or for the one or more input message for which the user did not take any action, the validation engine 212 may filter out or delete such spam messages for preventing them being further processed. In some examples, the validation engine 212 may retrain the logistic regression model after periodic intervals with additional datasets and/or with the feedback received from the user to improve classification accuracy. Thus, the feedback from the user is used for continuously improving determination of the spam messages.

Further, the validation engine 212 may perform the risk detection 310 to determine, based upon a risk score of each of remaining input messages that meets a specific threshold condition, whether the remaining input messages pose a security risk. In an example implementation, the validation engine 212 may perform threat analysis for the remaining input messages by calculating the risk score for each of the remaining input messages. The risk score is useful to identify high risk messages that may involve a data privacy risk or a malicious intent of the user. Example scenarios include:

1) A user may try to request for data that is not related to the user by impersonating a vendor using a similar email domain.
2) A user may try to modify a bank account number of a vendor by sharing publicly available and/or maliciously extracted information to convince an agent.

In an example implementation, the validation engine 212 may generate a prediction model by using a combination of clustering techniques and an artificial neural network (ANN). The prediction model may be multi-layer neural network model and is used to generate a risk score for each of the remaining input messages. For example, the prediction model may be stored in the model database 224. By way of non-limiting example, the risk score may vary between 0 and 1 for each of the remaining input messages. For example, 0 being low risk and 1 being high risk. In this example implementation, the validation engine 212 may collect data from historical messages or previous interactions as a set of messages previously received from multiple sources. Further, the validation engine 212 extracts intent of each of the interactions by using the ANN or decision trees. Also, the validation engine 212 performs named entity recognition using a bi-directional long short-term memory (LSTM) model which is a deep learning neural network model for extracting entities associated with the intent. The validation engine 212 may use the bi-directional LSTM model stored in the model database 224. An example intent and associated entities extracted from a message can be as follows:

1) Intent: Update address

Entities: Requestor: John, Vendor: ABC Corp, Address: Door No. 8, ABC Stre/et, NYC 2) Intent: Follow-up on payment Entities: Requestor: Peter, Vendor: ABC Corp, Month: January, Year: 2013, Invoice: 1234

Further, the validation engine 212 may generate a diverse set of clusters using a K-Means clustering model based on the extracted intent and associated entities of each of the historical messages. The validation engine 212 may then train the prediction model using data from the set of clusters. For example, the prediction model may contain an input layer, composed of neurons, multiple hidden layers, and output layer of a single neuron. The output of the prediction model may be in a range of 0 to 1. Further, the validation engine 212 may test the prediction model using a subset of the training data, to validate results.

Upon training and testing the prediction model, the validation engine 212 may implement the prediction model to start generating the risk score for each of the remaining input messages. For example, once a remaining message arrives, the prediction model extracts intent and entities, which are subsequently used for generating the risk score. For example, the risk score may be generated based on historical messages by a user and/or historical messages related to a same data point (e.g., a vendor parameter like an address or a bank account). If the risk score is high or the remaining message is at a high security risk or the risk score is above a predefined risk score threshold, the data ingestion module may send the remaining message to the user device 108 for validation. The user of the user device 108 may then review related information and may decide to modify the risk score via a user interface 308, which may be recorded and given as feedback to the validation engine 212 for continuous improvement. For example, the remaining messages that are deemed by the user to be a low security risk may be sent to the validation engine 212 for performing data masking. Further, the remaining messages with a high-security risk, after review by the user may be filtered and stored in the database 222 for audit and further investigation. The validation engine 212 may retrain the prediction model in frequent intervals with new training data based on the feedback received from the user.

The validation engine 212 may also identify personal identifiable information (PII) in the remaining input messages when the remaining input messages pose the low security risk. In an example, the validation engine 212 may identify a pattern corresponding to a phone number, an address information, an email address, and/or a social security number or a unique identification number in the remaining input messages. Further, the validation engine 212 may designate the pattern as the PII based at least in part upon a respective domain of the remaining input messages. Furthermore, the validation engine 212 may perform PII data masking 312 to remove and/or hide the PII from the remaining input messages to avoid the PII being displayed. Upon masking the data corresponding to the personal identifiable information, the validation engine 212 may transmit the remaining input messages to the database 222 or send the remaining input messages for data extraction 314. In some examples, non-sensitive information in the remaining input messages may be extracted.

In some examples, the orchestration engine 218 may perform data orchestration to maintain high availability and high throughput in real-time. In some examples, the data ingestion device 104 may be a transaction-heavy system, and service failures and/or intermittent failures may introduce transaction or request failures at a high rate. The intermittent failures can be identified based on absence of responses from the validation engine 212. Therefore, the orchestration engine 218 may auto-retry failed transactions with a predefined time delay. Also, the orchestration engine 218 may auto-scale an email receiver and associated services based on volume of the input messages 302A-N across mailboxes and clients. The orchestration engine 218 may use a combination of Kubernetes auto-scaler and distinct message design to auto-scale different services differently based on incoming load. For example, the Kubernetes auto-scaler may be a mechanism that helps to automatically adjust a number of resources and nodes in a Kubernetes cluster based on the volume of the input messages 302A-N. Thus, improving efficiency, cost-effectiveness, and performance by dynamically scaling up or down resources as needed.

Figure 4:
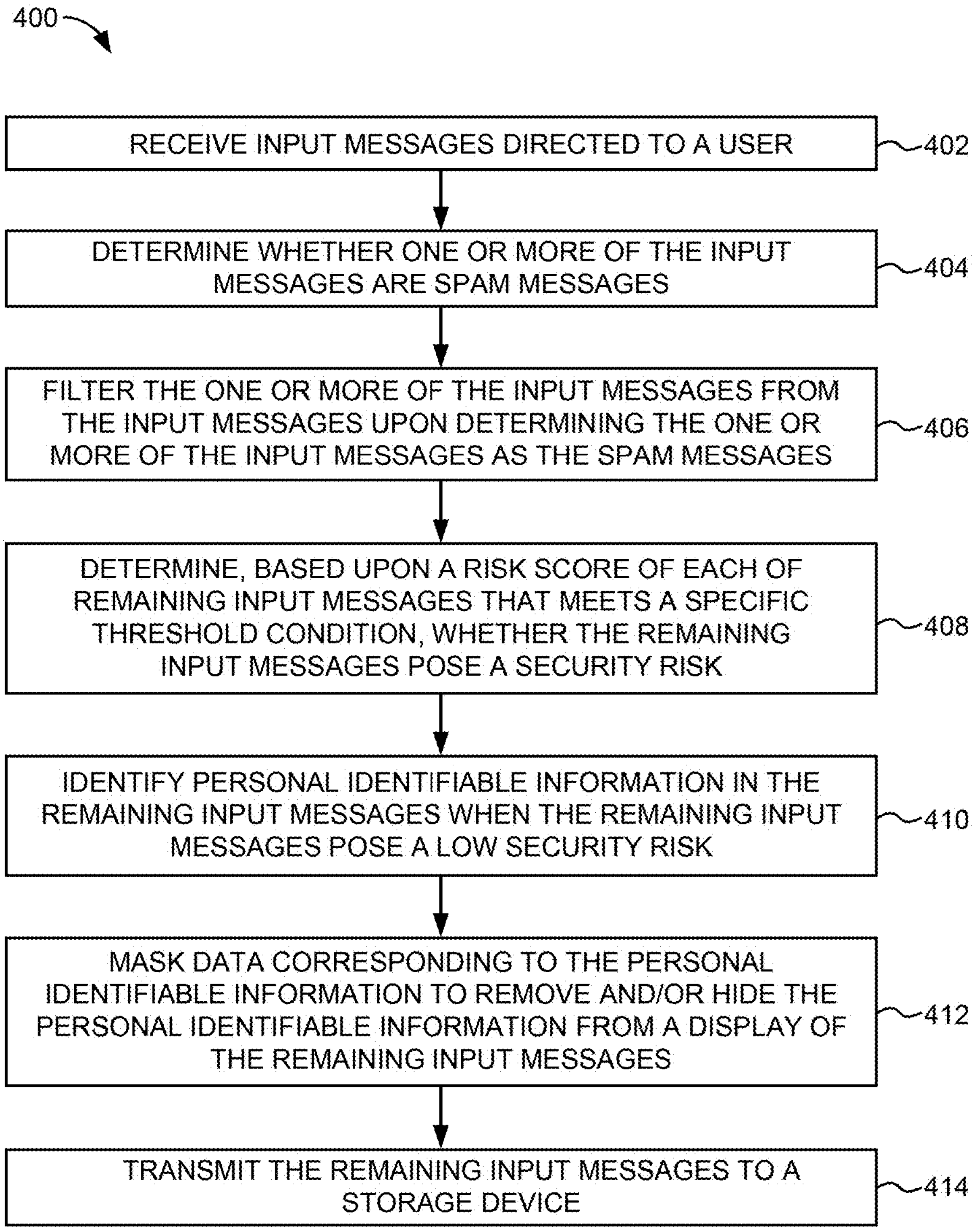
FIG. 4 is a flow diagram that presents an example method for performing data ingestion, in accordance with implementations of the present disclosure.

FIG. 4 is a flow diagram that presents an example computer implemented method 400 for performing data ingestion, in accordance with implementations of the present disclosure. In some implementations, the method 400 may be executed by the processor 202 (including the one or more processors), as described in relation to FIGS. 2-3.

The method 400 includes receiving 402 input messages directed to a user. The input messages may be received as an email, a text message, a chat message, an instant message, a social media message, a conversation transcript, and/or a file. The method 400 may include determining 404 whether one or more of the input messages are spam messages based upon one or more of: prior user actions, rule-based filtering criteria, a domain categorization, and/or a user validation. For example, the domain categorization may include determining a domain of each of the input messages using a logistic regression model. The domain of each of the input messages may include any one of a finance domain, a human resource domain, an information technology domain, and/or a medical or health domain. In this example, the logistic regression model is generated by collecting data of the input messages and inputs from a plurality of users and training the logistic regression model with the collected data using a supervised learning method. The method 400 may include filtering 406 the one or more of the input messages from the input messages that are determined 404 to be spam messages.

Upon filtering 406 the one or more of the input messages from the input messages, the method 400 may include determining 408, based upon a risk score of each of remaining input messages that meets a specific threshold condition, whether the remaining input messages pose a security risk. For example, the method 400 may include generating a prediction model. The prediction model may be a multi-layer neural network model.

In this example, the method 400 may include collecting data from a plurality of historical messages. Each message of the plurality of historical messages is received from a source of a plurality of sources. Further, the method 400 may include extracting an intent and associated one or more entities corresponding to each message of the plurality of historical messages. The method 400 may include generating a set of clusters based upon the extracted intent and associated one or more entities of the plurality of historical messages as training data. In an example, the set of clusters may be generated using a K-means clustering algorithm. The method 400 may include training and testing the prediction model using data of the set of clusters.

Further, the method 400 may include generating the risk score for an association of an intent and an entity of each of the remaining input messages using the trained and tested prediction model. For example, the intent and associated one or more entities corresponding to each of the remaining input messages or the historical messages are extracted using a decision tree and/or a bidirectional long short-term memory (LSTM) model. Based on the generated risk score of each of the remaining input messages, the method 400 may determine whether the remaining input messages pose the security risk. In some examples, the method 400 may include retraining and retesting the prediction model at a user-specified time interval using feedback received from the user.

The method 400 may further include identifying 410 personal identifiable information in the remaining input messages when the remaining input messages pose a low security risk. In some examples, the method 400 may include identifying a pattern corresponding to a phone number, an address information, an email address, and/or a social security number or a unique identification number. The method 400 may further include designating the pattern as the personal identifiable information based at least in part upon a respective domain of the remaining input messages.

The method 400 may include masking 412 data corresponding to the personal identifiable information to remove and/or hide the personal identifiable information from display of the remaining input messages. For example, masking may ensure that the personally identifiable information is hidden or altered in a way that prevents exposure to unauthorized users. Further, masking may preserve structure and integrity of the personally identifiable information. Upon masking the data corresponding to the personal identifiable information, the method 400 may include transmitting 414 the remaining input messages to a storage device.

Implementations of the present disclosure provide technical solutions to multiple technical problems that arise in the context of data security and privacy during the data ingestion. The proposed methodology augments existing spam filters to allow a stricter or narrower set of message categories to be sent for threat analysis, and to filter out everything else. Therefore, the threat analysis is performed on the filtered messages using intents and entities with improved accuracy, confidence level, rate of true positives, and/or the like. This, in turn, may improve response time, conserve computing resources, networking resources, and/or the like that otherwise have been overutilized in analyzing the risk scores, unnecessarily addressing false positive and false negative security alerts generated due to high-risk scores, and/or the like.

Implementations of the present disclosure further enable efficient identification and masking of the personal identification information for preventing sensitive data from being ingested into multiple systems. Therefore, the proposed methodology improves overall security of the input messages, while enhancing threat detection and prevention capabilities.

Figure 5:
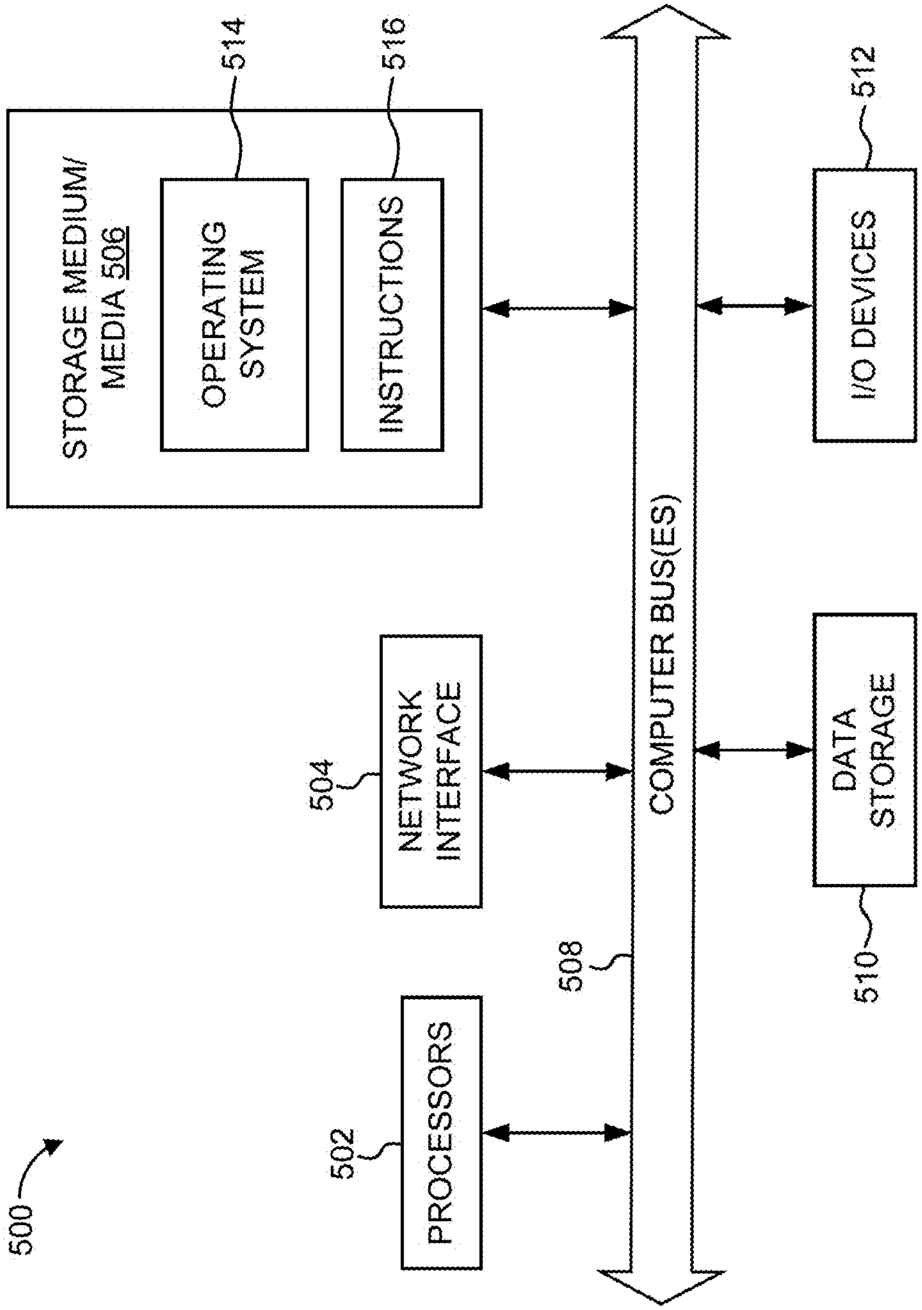
FIG. 5 depicts a block diagram of an example computer system.

FIG. 5 depicts a computer system 500 that may be used to implement the data ingestion device 104. More particularly, computing machines such as desktops, laptops, smartphones, tablets, and wearables which may be used to perform the data ingestion. The computer system 500 may include additional components not shown and that some of the process components described may be removed and/or modified. In another example, a computer system 500 may be deployed on external-cloud platforms such as cloud, internal corporate cloud computing clusters, organizational computing resources, and/or the like.

The computer system 500 includes processor(s) 502, such as a central processing unit, ASIC or another type of processing circuit, input/output devices 504, such as a display, mouse keyboard, etc., a network interface 506, such as a Local Area Network (LAN), a wireless 802.11x LAN, a 3G or 4G mobile WAN or a WiMax WAN, and a computer-readable medium 508. Each of these components may be operatively coupled to a bus 510. The computer-readable medium 508 may be any suitable medium that participates in providing instructions to the processor(s) 502 for execution. For example, the computer-readable medium 508 may be non-transitory or non-volatile medium, such as a magnetic disk or solid-state non-volatile memory or volatile medium such as RAM. The instructions or modules stored on the computer-readable medium 508 may include machine-readable instructions 512 executed by the processor(s) 502 that cause the processor(s) 502 to perform the methods and functions of the device 104.

The data ingestion device 104 may be implemented as software stored on a non-transitory processor-readable medium and executed by the processor(s) 502. For example, the computer-readable medium 508 may store an operating system 514, such as MAC OS, MS WINDOWS, UNIX, or LINUX, and code, for the data ingestion device 104. The operating system 514 may be multi-user, multiprocessing, multitasking, multithreading, real-time, and the like. For example, during runtime, the operating system 514 is running and the code for the data ingestion device 104 is executed by the processor(s) 502.

The computer system 500 may include a data storage 516, which may include non-volatile data storage. The data storage 516 stores any data used or generated by the data ingestion device 104.

The network interface 506 connects the computer system 500 to internal systems for example, via a LAN. Also, the network interface 506 may connect the computer system 500 to the Internet. For example, the computer system 500 may connect to web browsers and other external applications and systems via the network interface 506.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer includes, or is operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 502 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet. The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:

receiving, by at least one computing device communicatively coupled with an application server, input messages directed to a user;

determining, by one or more processors of the at least one computing device, whether one or more of the input messages are spam messages based upon one or more of: prior user actions, rule-based filtering criteria, a domain categorization, and/or a user validation;

filtering, by the one or more processors, the one or more of the input messages from the input messages, upon determining the one or more of the input messages as the spam messages;

determining, by the one or more processors, based upon a risk score of each of remaining input messages that meets a specific threshold condition, whether the remaining input messages pose a security risk upon filtering the one or more of the input messages from the input messages;

identifying, by the one or more processors, personal identifiable information in the remaining input messages when the remaining input messages pose a low security risk;

masking, by the one or more processors, data corresponding to the personal identifiable information to remove and/or hide the personal identifiable information from display of the remaining input messages; and transmitting, by the one or more processors, the remaining input messages to a storage device communicatively coupled to the at least one computing device, upon masking the data corresponding to the personal identifiable information, wherein determining whether the remaining input messages pose the security risk comprises:

generating a prediction model by:

collecting data from a plurality of historical messages, wherein each message of the plurality of historical messages is received from a source of a plurality of sources;

extracting an intent and associated one or more entities corresponding to each message of the plurality of historical messages;

generating a set of clusters based upon the extracted intent and associated one or more entities of the plurality of historical messages as training data; and training and testing the prediction model using data of the set of clusters;

generating the risk score for an association of an intent and an entity of each of the remaining input messages using the trained and tested prediction model; and determining whether the remaining input messages pose the security risk based on the generated risk score of each of the remaining input messages.

2. The computer-implemented method of claim 1, wherein the input messages are received as an email, a text message, a chat message, an instant message, a social media message, a conversation transcript, and/or a file.

3. The computer-implemented method of claim 1, wherein the domain categorization comprises determining a domain of each of the input messages using a logistic regression model, and the logistic regression model is generated by collecting data of the input messages and inputs from a plurality of users and training the logistic regression model with the collected data using a supervised learning method.

4. The computer-implemented method of claim 3, wherein the domain of each of the input messages comprises any one of a finance domain, a human resource domain, an information technology domain, and/or a medical or health domain.

5. The computer-implemented method of claim 3, wherein identifying the personal identifiable information in the remaining input messages comprises:

identifying a pattern corresponding to a phone number, an address information, an email address, and/or a social security number or a unique identification number; and designating the pattern as the personal identifiable information based at least in part upon respective domain of the remaining input messages.

6. The computer-implemented method of claim 1, wherein the set of clusters is generated using a K-means clustering algorithm.

7. The computer-implemented method of claim 1, further comprising retraining and retesting the prediction model at a user-specified time interval using feedback received from the user.

8. The computer-implemented method of claim 1, wherein the prediction model is a multi-layer neural network model.

9. The computer-implemented method of claim 1, wherein the intent and associated one or more entities corresponding to each of the remaining input messages are extracted using a decision tree and/or a bidirectional long short-term memory model.

10. A system comprising:

at least one memory storing instructions; and at least one processor communicatively coupled with the at least one memory and configured to execute the stored instructions to perform operations comprising:

receiving input messages directed to a user;

determining whether one or more of the input messages are spam messages based upon one or more of: prior user actions, rule-based filtering criteria, a domain categorization, and/or a user validation;

filtering the one or more of the input messages from the input messages, upon determining the one or more of the input messages as the spam messages;

determining, based upon a risk score of each of remaining input messages that meets a specific threshold condition, whether the remaining input messages pose a security risk upon filtering the one or more of the input messages from the input messages;

identifying personal identifiable information in the remaining input messages when the remaining input messages pose a low security risk;

masking data corresponding to the personal identifiable information to remove and/or hide the personal identifiable information from display of the remaining input messages; and transmitting the remaining input messages, upon masking the data corresponding to the personal identifiable information, wherein determining whether the remaining input messages pose the security risk comprises:

generating a prediction model by:

collecting data from a plurality of historical messages, wherein each message of the plurality of historical messages is received from a source of a plurality of sources;

extracting an intent and associated one or more entities corresponding to each message of the plurality of historical messages;

generating a set of clusters based upon the extracted intent and associated one or more entities of the plurality of historical messages as training data; and training and testing the prediction model using data of the set of clusters;

generating a risk score value for an association of an intent and an entity of each of the remaining input messages using the trained and tested prediction model; and determining whether the remaining input messages pose the security risk based on the generated risk score of each of the remaining input messages.

11. The system of claim 10, wherein the input messages are received as an email, a text message, a chat message, an instant message, a social media message, a conversation transcript, and/or a file.

12. The system of claim 10, wherein the domain categorization comprises determining a domain of each of the input messages using a logistic regression model, and the logistic regression model is generated by collecting data of the input messages and inputs from a plurality of users and training the logistic regression model with the collected data using a supervised learning method.

13. The system of claim 12, wherein the domain of each of the input messages comprises any one of a finance domain, a human resource domain, an information technology domain, and/or a medical or health domain.

14. The system of claim 12, wherein identifying the personal identifiable information in the input message comprises:

identifying a pattern corresponding to a phone number, an address information, an email address, and/or a social security number or a unique identification number; and designating the pattern as the personal identifiable information based at least in part upon respective domain of the remaining input messages.

15. The system of claim 10, wherein the set of clusters is generated using a K-means clustering algorithm, and the prediction model is a multi-layer neural network model.

16. The system of claim 10, wherein the operations further comprise retraining and retesting the prediction model at a user-specified time interval using feedback received from the user.

17. The system of claim 10, wherein the intent and associated one or more entities corresponding to each of the remaining input messages are extracted using a decision tree and/or a bidirectional long short-term memory model.

18. A non-transitory computer-readable media comprising instructions stored thereon, which when executed by at least one processor of at least one computing device, cause the at least one computing device to perform operations comprising:

receiving input messages directed to a user;

determining whether one or more of the input messages are spam messages based upon one or more of: prior user actions, rule-based filtering criteria, a domain categorization, and/or a user validation;

filtering the one or more of the input messages from the input messages, upon determining the one or more of the input messages as the spam messages;

determining, based upon a risk score of each of remaining input messages that meets a specific threshold condition, whether the remaining input messages pose a security risk upon filtering the one or more of the input messages from the input messages;

identifying personal identifiable information included in the remaining input messages when the remaining input messages pose a low security risk;

masking data corresponding to the personal identifiable information to remove and/or hide the personal identifiable information from display of the remaining input messages; and transmitting the remaining input messages for data ingestion, upon masking the data corresponding to the personal identifiable information, wherein determining whether the remaining input messages pose the security risk comprises:

generating a prediction model by:

collecting data from a plurality of historical messages, wherein each message of the plurality of historical messages is received from a source of a plurality of sources;

extracting an intent and associated one or more entities corresponding to each message of the plurality of historical messages;

generating a set of clusters based upon the extracted intent and associated one or more entities of the plurality of historical messages as training data; and training and testing the prediction model using data of the set of clusters;

generating a risk score value for an association of an intent and an entity of each of the remaining input messages using the trained and tested prediction model; and determining whether the remaining input messages pose the security risk based on the generated risk score of each of the remaining input messages.

* * * * *